(12) United States Patent
Terautchi

(10) Patent No.: US 12,196,544 B2
(45) Date of Patent: Jan. 14, 2025

(54) TEST INDICATOR

(71) Applicant: MITUTOYO CORPORATION, Kawasaki (JP)

(72) Inventor: Tatsushi Terautchi, Gifu (JP)

(73) Assignee: MITUTOYO CORPORATION, Kawasaki (JP)

( * ) Notice: Subject to any disclaimer, the term of this patent is extended or adjusted under 35 U.S.C. 154(b) by 384 days.

(21) Appl. No.: 17/660,219

(22) Filed: Apr. 22, 2022

(65) Prior Publication Data

US 2022/0341733 A1 Oct. 27, 2022

(30) Foreign Application Priority Data

Apr. 27, 2021 (JP) .................................. 2021-075437

(51) Int. Cl.
| | | |
|---|---|---|
| *G01B 21/04* | (2006.01) | |
| *G01B 3/00* | (2006.01) | |
| *G06F 3/0354* | (2013.01) | |

(52) U.S. Cl.
CPC ........... *G01B 21/047* (2013.01); *G01B 3/002* (2013.01); *G06F 3/03545* (2013.01)

(58) Field of Classification Search
CPC .............................. G01B 21/045; G01B 21/047
USPC .......................................... 33/1 PT, 502, 558
See application file for complete search history.

(56) References Cited

U.S. PATENT DOCUMENTS

| | | | | |
|---|---|---|---|---|
| 3,996,670 A | * | 12/1976 | Joyal ........................ | G01B 7/30 33/538 |
| 5,450,335 A | * | 9/1995 | Kikuchi ............... | G02C 13/003 356/601 |
| 6,427,350 B1 | * | 8/2002 | Asaoka ................... | B24B 9/144 33/200 |

(Continued)

FOREIGN PATENT DOCUMENTS

| | | |
|---|---|---|
| JP | 2008-309687 A | 12/2008 |
| JP | 2016-145771 A | 8/2016 |

OTHER PUBLICATIONS

Office Action dated Nov. 12, 2024, issued in counterpart JP Application No. 2021-075437, w/English Translation, citing documents No. 15. (6 pages).

*Primary Examiner* — George B Bennett
(74) *Attorney, Agent, or Firm* — Oblon, McClelland, Maier & Neustadt, L.L.P.

(57) ABSTRACT

There is provided a test indicator 100 capable of replacing a stylus 210 with another stylus 210 having a different length to increase a reaching range of the stylus 210, and of increasing a rotation angle of the stylus 210 to display an accurate measurement value in a wide measurement range. A calculation unit 400 of the test indicator 100 includes a stylus-length storage unit 420 that sets and stores a length of the stylus 210, and a stylus-length correction calculation unit 400 that changes, according to the length of the stylus 210, a conversion ratio for converting a detection value by an encoder 340 into a measurement value to correct the measurement value. The calculation unit 400 further includes a (Continued)

rotation-angle calculation unit 410 that calculates a rotation angle $\alpha s$[rad] of the stylus 210 based on the detection value by the encoder 340 and an arc-chord error correction calculation unit 400 that multiplies a sine value using the rotation angle $\alpha s$ calculated by the rotation-angle calculation unit 410 as an argument to correct the measurement value.

10 Claims, 8 Drawing Sheets

(56) References Cited

U.S. PATENT DOCUMENTS

| | | | | |
|---|---|---|---|---|
| 6,681,495 | B2 * | 1/2004 | Masayuki | B25J 17/0266 |
| | | | | 73/1.79 |
| 7,503,125 | B2 * | 3/2009 | Jordil | G01B 21/047 |
| | | | | 33/503 |
| 7,647,706 | B2 * | 1/2010 | Jordil | G01B 21/045 |
| | | | | 33/503 |
| 7,825,367 | B2 * | 11/2010 | Nakamura | G01D 5/2448 |
| | | | | 33/1 PT |
| 8,006,398 | B2 * | 8/2011 | McFarland | G05B 19/401 |
| | | | | 73/104 |
| 8,635,783 | B2 * | 1/2014 | McDonnell | G01B 5/008 |
| | | | | 33/502 |
| 9,322,631 | B2 * | 4/2016 | Scott | G01B 5/252 |
| 9,542,355 | B2 * | 1/2017 | Somerville | G06F 15/00 |
| 9,933,277 | B2 * | 4/2018 | Terauchi | G01B 5/28 |
| 10,401,162 | B2 * | 9/2019 | Lummes | G05B 19/401 |
| 11,940,270 | B2 * | 3/2024 | Ruck | G01B 21/047 |
| 2010/0231923 | A1 * | 9/2010 | Ge | G01M 11/025 |
| | | | | 356/601 |
| 2021/0232240 | A1 * | 7/2021 | Smith | G06F 3/04162 |
| 2022/0079687 | A1 * | 3/2022 | Sexson | A61B 34/20 |
| 2022/0307811 | A1 * | 9/2022 | Bulled | B25J 9/1623 |
| 2023/0314563 | A1 * | 10/2023 | Hartmann | G01S 13/84 |
| | | | | 342/125 |
| 2023/0368362 | A1 * | 11/2023 | Naruse | G06T 7/60 |

\* cited by examiner

TEST INDICATOR

INCORPORATION BY REFERENCE

This application is based upon and claims the benefit of priority from JP patent application No. 2021-075437, filed on Apr. 27, 2021 (DAS code: 12EC), The disclosure of which are incorporated herein in its entirety by reference.

BACKGROUND OF THE INVENTION

Field of the Invention

This invention relates to a test indicator.

Description of Related Art

Test indicators (so-called lever-type dial indicators) are known (for example, JP 2008-309687 A).

A test indicator includes a contact point rotatably supported about an axis by a body case. The contact point has a contact point at its tip end. The test indicator increases the displacement of the contact point by the principle of leverage. This makes the test indicator a highly accurate, high-resolution measuring tool.

Test indicators are used to measure minute displacements, such as circumferential flexure, total flexure, flatness, and parallelism, and for a precise comparison inspection, such as a machining error of a machined product with respect to a master work (or a block gauge).

SUMMARY OF THE INVENTION

When a test indicator is used, the contact point should not be replaced with one of a different length.

Due to its structural characteristic of increasing the displacement (rotation displacement) of the stylus, which rotates around the rotation axis, using the principle of leverage, if the length of the stylus changes, the increase ratio is changed. This makes the displayed measurement value completely different from the displacement of the contact point. For this reason, different models with different lengths of the stylus need to be prepared to change the length of the stylus depending on an object to be measured or the measurement conditions.

Considering a machining field where many objects to be measured (workpieces) are inspected simultaneously and in parallel, multiple models with different stylus lengths need be prepared.

The test indicator is a highly convenient measuring tool that has a high accuracy and a high resolution and is capable of performing simple measurement. However, the length of its stylus is 15 mm to 20 mm, and the test indicator cannot measure the deepest part of the inner surface of a hole having a depth of, for example, 20 mm or more. This is because that flexure occurs in the stylus if the stylus is longer than 20 mm, which causes a large measurement error.

The test indicator can be used for very minute shape inspection, but cannot be used when the measurement range exceeds 2 mm. This is because that the stylus rotates, and the arc trajectory and the vertical displacement of the contact point can be regarded as the same within a minute range, but the difference between the arc length and the vertical displacement of the contact point increases as the rotation angle increases.

Due to the limitation of the length of the stylus and the rotation angle, the measurement range of the test indicator is limited to 2 mm at most.

A purpose of the present invention is to provide a test indicator capable of replacing a stylus with another stylus having a different length to increase a reaching range of the stylus, and of increasing a rotation angle of the stylus to display an accurate measurement value in a wide measurement range.

A test indicator according to an exemplary embodiment of the present invention including:
  a stylus having a contact point at a tip end, the contact point being brought into contact with a surface of an object to be measured;
  a body case pivotally supporting the stylus in such a manner as to be rotatable;
  an encoder configured to detect a rotation displacement amount of the stylus;
  a calculation unit configured to convert a detection value by the encoder into a displacement amount of the contact point to calculate a measurement value; and
  a display unit configured to display the measurement value, wherein
  the calculation unit is configured to correct the measurement value based on at least one or more of a length of the stylus, a rotation angle of the stylus, and flexure of the stylus.

In an exemplary embodiment of the present invention, it is preferable that the calculation unit includes:
  a rotation-angle calculation unit configured to calculate a rotation angle $\alpha s$[rad] of the stylus based on the detection value by the encoder, and
  an arc-chord error correction calculation unit configured to multiply a sine value using the rotation angle $\alpha s$ calculated by the rotation-angle calculation unit as an argument to correct the measurement value.

In an exemplary embodiment of the present invention, it is preferable that the calculation unit includes:
  a stylus-length storage unit configured to set and store the length of the stylus;
  a reference flexure-error storage unit configured to store, as a reference flexure error $\delta sf$, a flexure error of a reference stylus actually measured when the reference stylus having a predetermined reference length Gs is used;
  a flexure calculation unit configured to correct the reference flexure error $\delta sf$ according to the length of the stylus to calculate an actual flexure error $\delta cf$ being an actual flexure error; and
  a flexure-error correction calculation unit configured to add the actual flexure error $\delta cf$ calculated by the flexure calculation unit to correct the measurement value.

In an exemplary embodiment of the present invention, it is preferable that the calculation unit includes:
  a stylus-length storage unit configured to set and store the length of the stylus;
  a reference outward-path flexure-error storage unit configured to store, as a reference outward-path flexure error $\delta sf$, a flexure error of a reference stylus actually measured when the reference stylus having a predetermined reference length Gs rotates in a direction in which a rotation angle of the reference stylus increases;
  an outward-path flexure calculation unit configured to correct the reference outward-path flexure error $\delta sf$ according to the length of the stylus to calculate an actual outward-path flexure error $\delta cf$ being an actual flexure error;

a reference return-path flexure-error storage unit configured to store, as a reference return-path flexure error δsb, a flexure error of the reference stylus actually measured when the reference stylus having the predetermined reference length Gs rotates in a direction in which the rotation angle of the reference stylus decreases;

a return-path flexure calculation unit configured to correct the reference return-path flexure error δsb according to the length of the stylus to calculate an actual return-path flexure error δcb being an actual flexure error; and a flexure-error correction calculation unit configured to add the actual outward-path flexure error δcf calculated by the outward-path flexure calculation unit to correct the measurement value when the stylus rotates in a direction in which the detection value by the encoder increases, and to add the actual return-path flexure error δcb calculated by the return-path flexure calculation unit to correct the measurement value when the stylus rotates in a direction in which the detection value by the encoder decreases.

A control method for a test indicator, the test indicator including:

a stylus having a contact point at a tip end, the contact point being brought into contact with a surface of an object to be measured; and a body case pivotally supporting the stylus in such a manner as to be rotatable, the control method comprising:

a rotation detection step of detecting, by an encoder, a rotation displacement amount of the stylus; and a calculation step of converting a detection value by the encoder into a displacement amount of the contact point to calculate a measurement value; and a display step of displaying the measurement value, wherein the calculation step includes correcting the measurement value based on at least one or more of a length of the stylus, a rotation angle of the stylus, and flexure of the stylus.

In an exemplary embodiment of the present invention, it is preferable that the calculation step includes:

a stylus-length storage step of setting and storing the length of the stylus; and a stylus-length correction calculation step of changing, according to the length of the stylus, a conversion ratio for converting the detection value by the encoder into the measurement value to correct the measurement value.

In an exemplary embodiment of the present invention, it is preferable that the calculation step includes:

a rotation-angle calculation step of calculating a rotation angle αs[rad] of the stylus based on the detection value by the encoder, and an arc-chord error correction calculation step of multiplying a sine value using the rotation angle αs calculated in the rotation-angle calculation step as an argument to correct the measurement value.

In an exemplary embodiment of the present invention, it is preferable that the calculation step includes:

a stylus-length storage step of setting and storing the length of the stylus;

a reference flexure-error storage step of storing, as a reference flexure error δsf, a flexure error of a reference stylus actually measured when the reference stylus having a predetermined reference length Gs is used;

a flexure calculation step of correcting the reference flexure error δsf according to the length of the stylus to calculate an actual flexure error δcf being an actual flexure error; and a flexure error correction calculation step of adding the actual flexure error δcf calculated in the flexure calculation step to correct the measurement value.

In an exemplary embodiment of the present invention, it is preferable that the calculation step includes:

a stylus-length storage step of setting and storing the length of the stylus;

a reference outward-path flexure-error storage step of storing, as a reference outward-path flexure error δsf, a flexure error of a reference stylus actually measured when the reference stylus having a predetermined reference length Gs rotates in a direction in which a rotation angle of the reference stylus increases;

an outward-path flexure calculation step of correcting the reference outward-path flexure error δsf according to the length of the stylus to calculate an actual outward-path flexure error δcf being an actual flexure error;

a reference return-path flexure-error storage step of storing, as a reference return-path flexure error δsb, a flexure error of the reference stylus actually measured when the reference stylus having the predetermined reference length Gs rotates in a direction in which the rotation angle of the reference stylus decreases;

a return-path flexure calculation step of correcting the reference return-path flexure error δsb according to the length of the stylus to calculate an actual return-path flexure error δcb being an actual flexure error; and a flexure error correction calculation step of adding the actual outward-path flexure error δcf calculated in the outward-path flexure calculation step to correct the measurement value when the stylus rotates in a direction in which the detection value by the encoder increases, and of adding the actual return-path flexure error δcb calculated in the return-path flexure calculation step to correct the measurement value when the stylus rotates in a direction in which the detection value by the encoder decreases.

DETAILED DESCRIPTION

Figure 1:
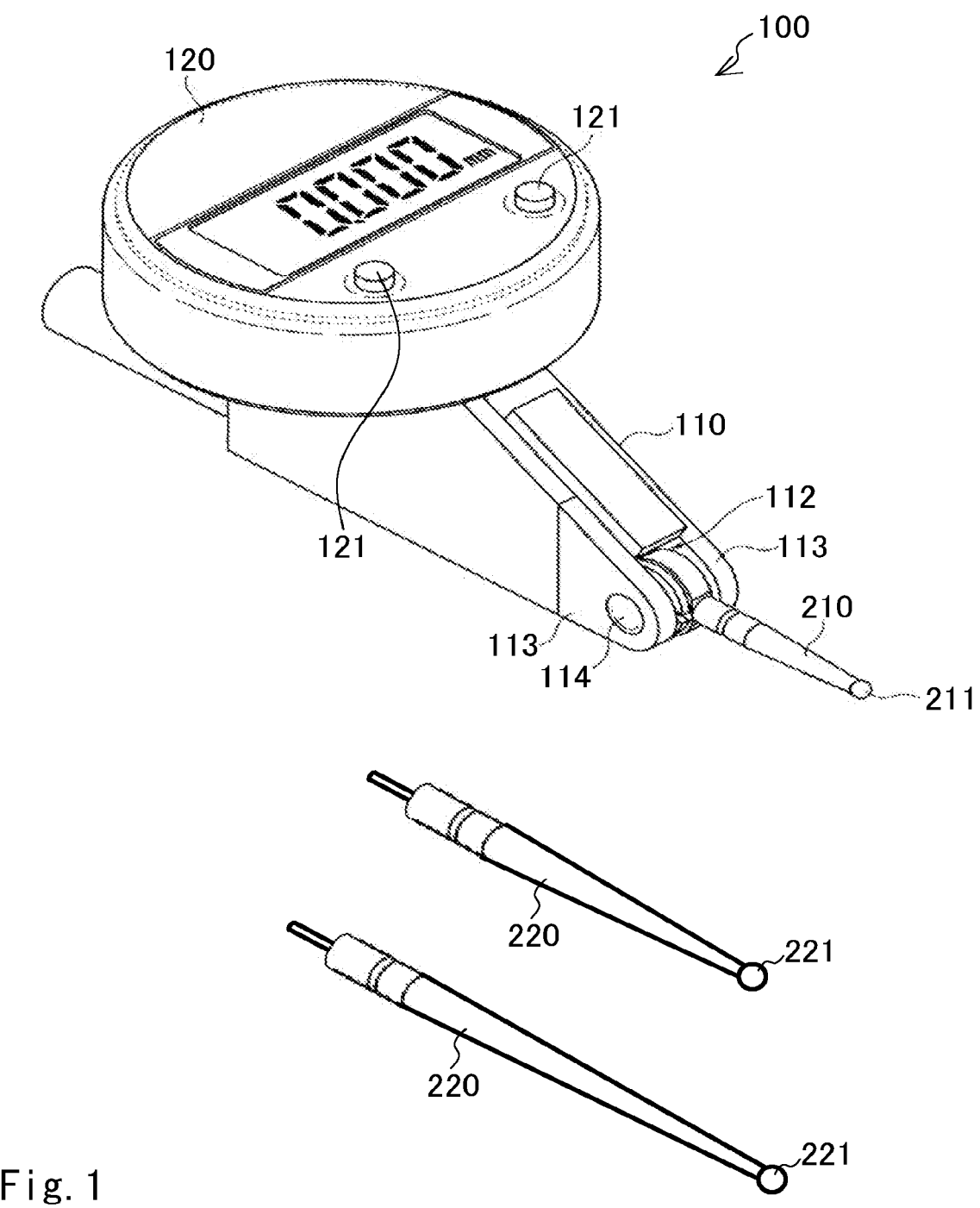
FIG. 1 is an external view of a test indicator.

Embodiments of the present invention are illustrated and described with reference to the reference signs attached to the elements in the drawings.

First Exemplary Embodiment

The basic structure of a test indicator 100 itself is well known but is briefly described below.

FIG. 1 is an external view of the test indicator according to the present exemplary embodiment.

The test indicator 100 includes a body case 110, a stylus 210 rotatably supported by the body case 110, and a display 120 that digitally displays a rotation displacement amount of the stylus 210.

The stylus 210 is an elongated rod-shaped body, exposed from an insertion hole 112 formed in the body case 110, and supported about an axis by a bearing member 114 provided in a bearing part 113 of the body case 110. The stylus 210 has a contact point 211 at its tip end.

The display 120 is formed in a flat disk shape and is attached to the body case 110. On the display 120, two switches (input means) 121 are disposed. The switches 121 are used for input of various commands or setting values in addition to power ON/OFF and display switching.

In the present exemplary embodiment, a plurality of replacement styli 220 are prepared, and the stylus 210 can be replaced with any one of the replacement styli 220. The replacement styli 220 may be made of different materials or have different shapes and sizes of contact points 221. In this specification, it is assumed that a plurality of styli 220 of different lengths is prepared.

Here, the stylus 210 attached by default to the test indicator 100 is referred to as the "reference stylus 210". The length of the reference stylus 210 is referred to as a "reference length", and the reference length is represented by Gs.

In the present exemplary embodiment, the reference length Gs is set to, for example, 10 mm, but the length Gs of the reference stylus 210 attached by default may be different according to the model of each test indicator 100.

Figure 2:
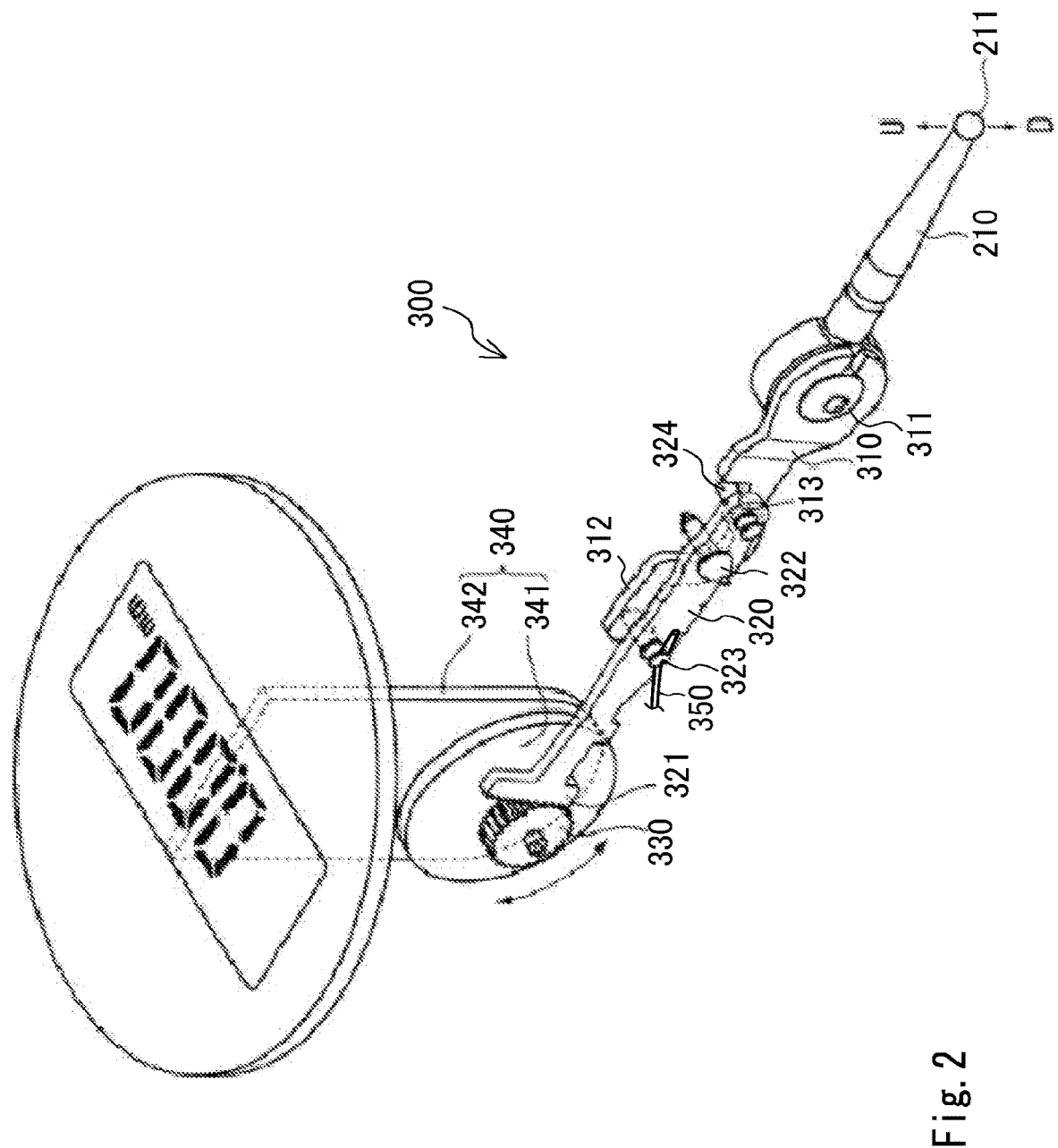
FIG. 2 is a partial perspective view of an internal structure of the test indicator.

FIG. 2 is a partial perspective view of an internal structure of the test indicator 100.

Inside the body case 110, a first arm 310, a second arm 320, a pinion 330, and an encoder (rotary encoder) 340 are disposed. The first arm 310 is connected with the stylus 210 in such a manner as to pivotally support the rotation axis of the stylus 210. The second arm 320 is adjacent to the first arm 310 on the opposite side of the stylus 210 and has a sector gear 321 at its end. The pinion 330 is engaged with the sector gear 321. The encoder 340 can detect a rotation amount of the pinion 330 as an electrical signal.

The rotary encoder 340 has a rotor (movable body) 341 and a stator (fixed body) 342 and detects a rotation angle of the rotor 341. The encoder may be an absolute (ABS) type that detects the absolute angle within one rotation or an incremental type.

The operation in which the swinging of the stylus 210 is transmitted to the encoder 340 is briefly described.

Supposing that the stylus 210 swings in the direction U in FIG. 2, then the first arm 310 rotates counterclockwise in FIG. 2 about the first shaft 311. At this time, a moving surface (distal-side moving surface) 312 of the first arm 310 moves downward in FIG. 2, and this downward movement of the distal-side moving surface 312 causes a transmission pin (distal-side transmission pin) 323 of the second arm 320 to move downward in FIG. 2. This causes the second arm 320 to rotate counterclockwise about a second shaft 322. Then, this downward movement of the second arm 320 causes the pinion 330 to rotate clockwise via the sector gear 321. The rotation of the pinion 330 is detected by the encoder 340.

Next, supposing that the stylus 210 swings in the direction D, then the first arm 310 rotates clockwise in FIG. 2 about the first shaft 311. At this time, a moving surface (Proximal-side moving surface) 313 of the first arm 310 moves upward in FIG. 2, and a transmission pin (proximal-side transmission pin) 324 of the second arm 320 is pushed upward in FIG. 2. This causes the second arm 320 to rotate counterclockwise about the second shaft 322. Then, the downward movement of the second arm 320 causes the pinion 330 to rotate clockwise via the sector gear 321.

In other words, regardless of the direction of swinging of the stylus 210, the second arm 320 rotates counterclockwise, and the pinion 330 rotates clockwise.

The lever ratio is designed in such a manner that the increase factor is the same when the stylus 210 rotates in the U direction and when the stylus 210 rotates in the D direction. This is because that the relative positions of the first shaft 311, the second shaft 322, the distal-side transmission pin 323, and the proximal-side transmission pin 324 determine the distance between the fulcrum and the action. Thus, these relative positions (relative distances) are determined in such a manner that the pinion 330 rotates the same amount in forward and reverse rotation.

Since the lever ratio of the internal transmission mechanism 300 is fixed, the rotation amount of the stylus 210 and the rotation amount of the pinion 330 have a one-to-one relationship if the rotation direction is ignored. By detecting the rotation amount of the pinion 330 by the encoder 340 and multiplied by a predetermined conversion ratio, the rotation amount of the stylus 210 can be obtained. If the length of the stylus 210 is fixed, the displacement of the contact point 211 can be determined from the rotation amount of the stylus 210.

Since the second arm 320 rotates counterclockwise as the stylus 210 is displaced (rotational movement), a biasing means 350 is provided to apply a biasing force in the direction in which the second arm 320 is rotated clockwise as a return force. The biasing means (for example, a wire spring) 350 provides a return force to return the stylus 210 to its original position and also provides a contact force (measuring force) to bring the contact point 211 into contact with an object to be measured. When the return force is applied to the second arm 320 is, the second arm 320 is returned to the position (initial position) where the distal-side transmission pin 323 is in contact with the distal-side moving surface 312, and the proximal-side transmission pin 324 is in contact with the proximal-side moving surface 313.

Here, an "outward path" and a "return path" are explained.

The case in which the stylus 210 rotates against the biasing force (return force) when the contact point 211 is brought into contact with an object to be measured is defined as the "outward path". In other words, the direction in which the detection value of the encoder 340 increases as the stylus 210 is rotated (the contact point 211 is displaced) regardless of whether the contact point 211 rotates counterclockwise (in the direction U) or clockwise (in the direction D) is the "outward path".

Conversely, the case in which the stylus 210 rotates in the direction in which the stylus 210 is returned by the biasing force (return force) is defined as a "return-path". In other words, the direction in which the detection value of the encoder 340 decreased as the stylus 210 is rotated (the contact point 211 is displaced) regardless of whether the contact point 211 rotates counterclockwise (in the direction U) or clockwise (in the direction D) is the "return path".

In the case of continuously performing scanning measurement on the unevenness (or undulation) of the surface of an object to be measured, the contact point 211 moves upward and downward according to the surface shape of the object to be measured. At this time, the displacement direction of the contact point 211 is a repetition of the "outward path" and the "return path" paths are repeated.

During the "outward path", an almost prescribed "measurement force" is expected to be applied between the contact point 211 and the object to be measured.

During the "return path", the measurement force applied between the contact point 211 and the object to be measured is expected to be less than the prescribed "measurement force".

The difference in measuring force causes a difference in the force between the contact point 211 and the object to be measured and in the frictional force in the internal transmission mechanism 300, which is a factor to cause a difference in measurement value (return error) between the "outward path" and "return-path" measurements, even when uneven surfaces of the same height are measured. As the lengths of the styli 210 and 220 increase, the return error also increases due to the greater flexure of the styli 210 and 220, and the like, and these errors cannot be ignored.

Figure 3:
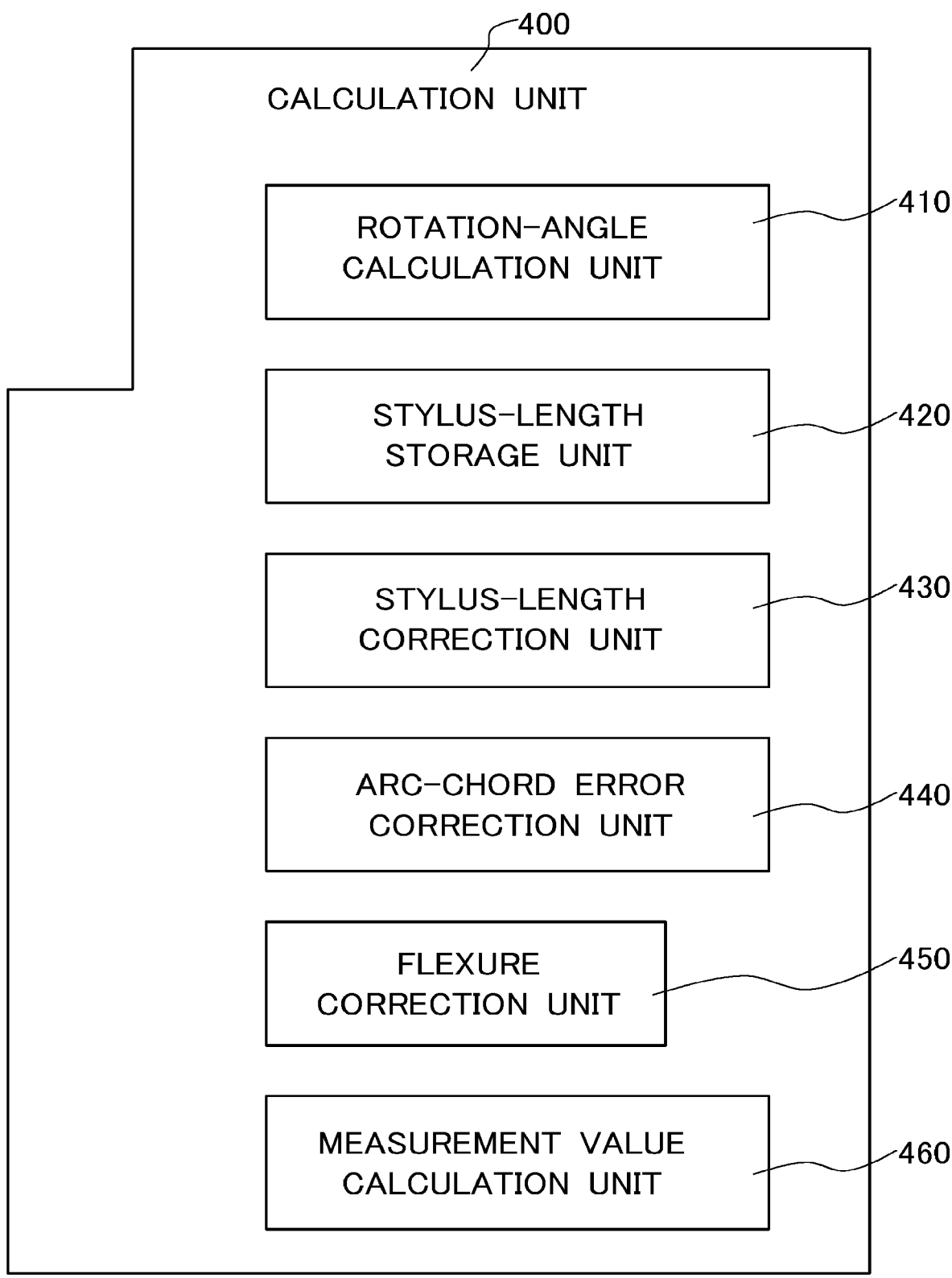
FIG. 3 is a functional block diagram showing a control circuit.

Next, FIG. 3 is a functional block diagram for explaining an internal control circuit.

The control circuitry is provided on a circuit board or an integrated circuit chip disposed in the body case 110 or the display 120. A calculation unit 400 is constituted by a central processing unit (CPU), and a ROM and RAM incorporating a predetermined control program, and performs functions as functional units described in FIG. 3 by executing the predetermined program.

The calculation unit 400 includes a rotation-angle calculation unit 410, a stylus-length storage unit 420, a stylus-length correction unit 430, an arc-chord error correction unit 440, a flexure correction unit 450, and a measurement value calculation unit 460.

Each functional unit is described in order.

The rotation-angle calculation unit 410 calculates a rotation angle ($\alpha$[rad]) of the stylus 210 from a detection value of the encoder 340 (a rotation-angle calculation step). Since the lever ratio of the internal transmission mechanism 300 is fixed, the rotation angle of the stylus 210 ($\alpha m$[rad]) is obtained by multiplying the rotation amount ($\alpha p$) of the pinion 330 detected by the encoder 340 by a predetermined conversion ratio (Rr).

$$\alpha m = Rr \times \alpha p$$

The stylus-length storage unit 420 is a memory that stores length information about the stylus 210.

First, when the products are shipped, the length of the reference stylus 210 (reference length) Gs is set and stored in the stylus-length storage unit 420 as a default value (a stylus-length storage step). For example, the reference length Gs is 10 mm.

If the stylus 210 is the default reference stylus 210, a displacement Ls of the contact point 211 is obtained as follows.

Figure 4:
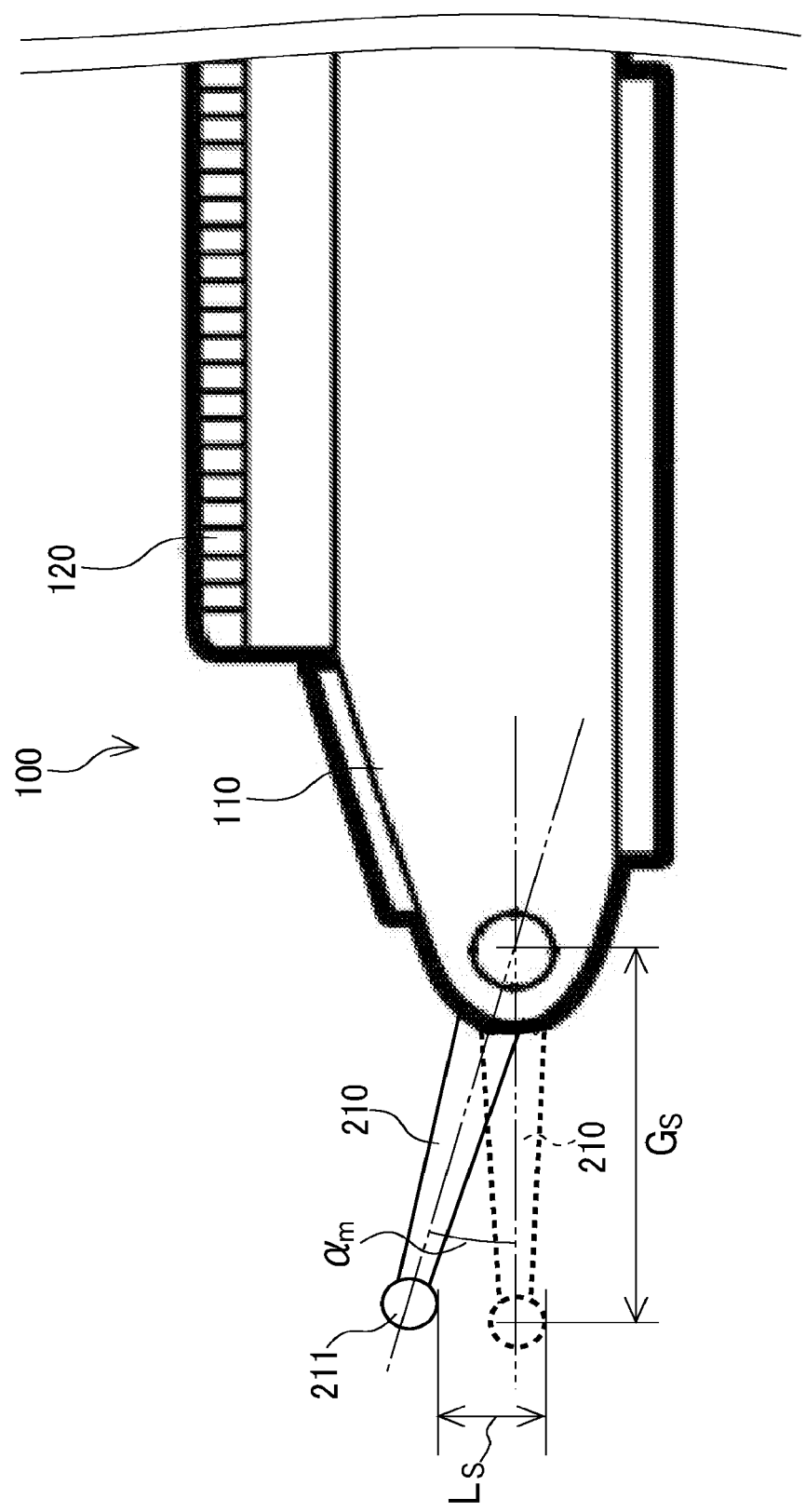
FIG. 4 is a diagram schematically showing a displacement Ls of a contact point when a stylus rotates.

FIG. 4 is a diagram schematically showing the displacement Ls of the contact point 211 when the stylus rotates.

The rotation angle $\alpha m$[rad] of the stylus 210 has been obtained earlier by the rotation-angle calculation unit 410. Thus, if the stylus 210 is the default reference stylus 210, the displacement Ls of the contact point 211 is obtained as follows:

$$Ls = Gs[mm] \times \alpha m[rad]$$

$$(= Gs[mm] \times Rr \times \alpha p[rad])$$

With the conventional test indicator 100, the measurement value calculation unit 460 calculates the displacement Ls of the contact point 211 by multiplying the rotation angle $\alpha m$ (=$Rr \times \alpha p$[rad]) of the stylus 210 obtained by the rotation-angle calculation unit 410 by the reference length Gs, and outputs the displacement Ls (displays Ls on the display 120) as a measurement value (a display step).

The test indicator 100 in the present exemplary embodiment allows a user to replace the stylus 210 when the test indicator 100 is used.

When replacing the stylus 210, the user sets the length Gc of the stylus 220 to be used in the stylus-length storage unit 420 (the stylus-length storage step).

In this case, the user may directly input the numerical value of the length Gc of the stylus 220. Alternatively, the types of the replaceable styli 220 and their lengths may be preset in the stylus-length storage unit 420 as a selection menu in order for the user to select the type (the length Gc) of the stylus 220 from the selection menu. For example, the length Gc of the stylus 220 is set to 20 mm, which is twice the reference length Gs.

The stylus-length correction unit 430 calculates a correction ratio to obtain the measurement value (the displacement Lc of the contact point 221) according to the length Gc of the stylus 220 in use. That is, if the stylus 220 in use is the replaced stylus 210 having the length Gc, the correction ratio is Gc/Gs. Also, if the stylus 210 has the default reference length Gs, the current stylus length Gc is the reference length Gs (Gc=Gs), and the correction ratio is "1".

Figure 5:
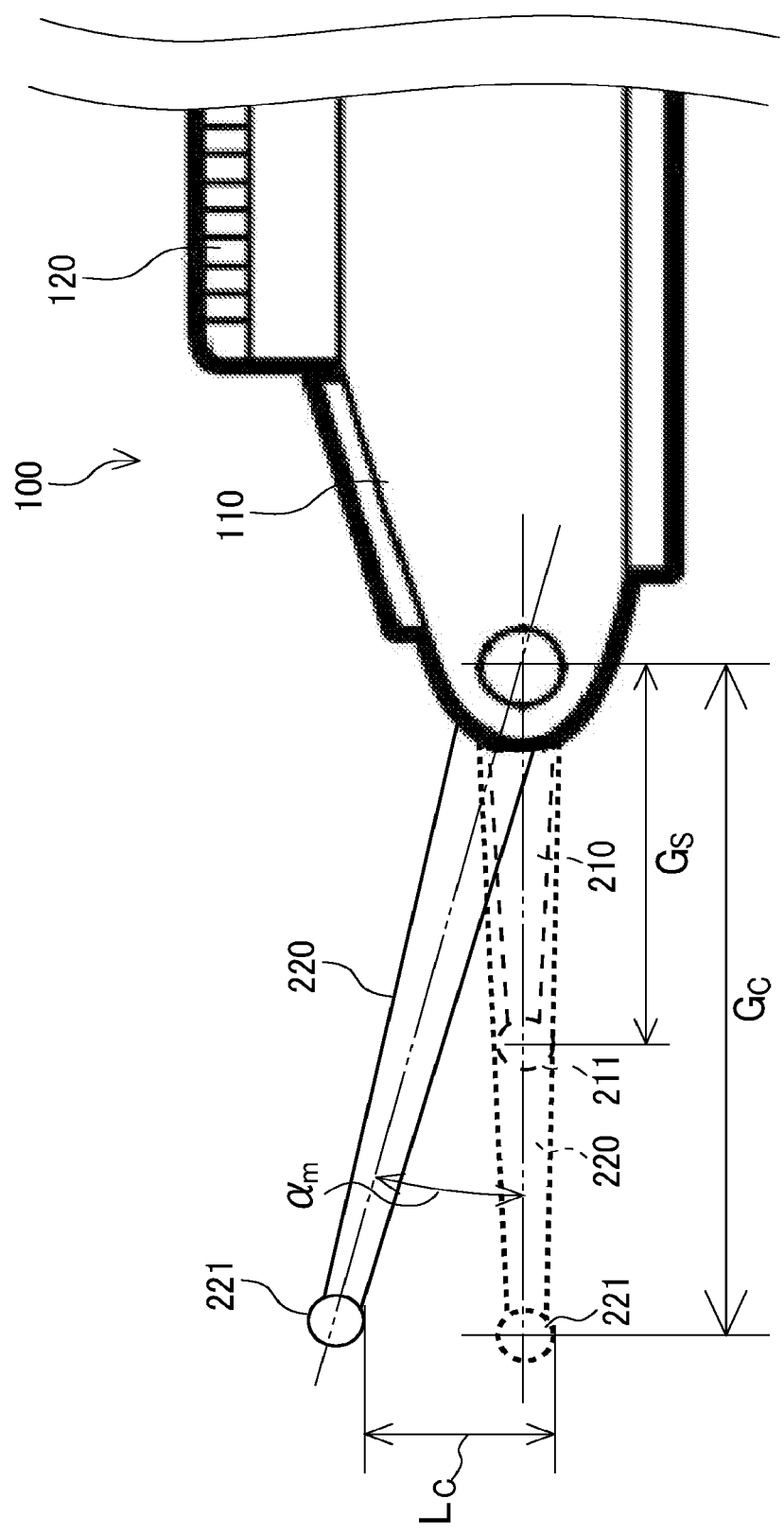
FIG. 5 is a diagram schematically showing a displacement Lc of the contact point when the stylus rotates.

Here, FIG. 5 is a diagram schematically showing the displacement Lc of the contact point 221 when the stylus 220 rotates.

If the length of the stylus 220 currently in use is Gc, then the displacement Lc of the contact point 221 is calculated as follows:

$$Lc = (Gc/Gs) \times Gs[mm] \times \alpha m[\text{rad}]$$

$$(= (Gc/Gs) \times Gs[mm] \times Rr \times \alpha p[\text{rad}])$$

If it is only required to correct the stylus length, the measurement value calculation unit 460 calculates the displacement Lc of the contact point 211 by multiplying the rotation angle $\alpha m$ (=$Rr \times \alpha p$[rad]) of the stylus 220, the reference length Gs, and the stylus length correction ratio (Gc/Gs) (a stylus-length correction calculation step), and outputs the displacement Lc (displays Lc on the display 120) as a measurement value.

Here, the stylus-length correction unit 430 and the measurement value calculation unit 460 constitute a stylus-length correction calculation unit (the stylus-length correction calculation step).

Now, the arc-chord error correction unit 440 is described.

The test indicator 100 in the present exemplary embodiment allows its stylus to be replaced with a longer stylus, which alone makes the measurement range wider, but also aims to achieve the widest measurement range as much as possible by further allowing larger rotation angles of the styli 210 and 220.

Figure 6:
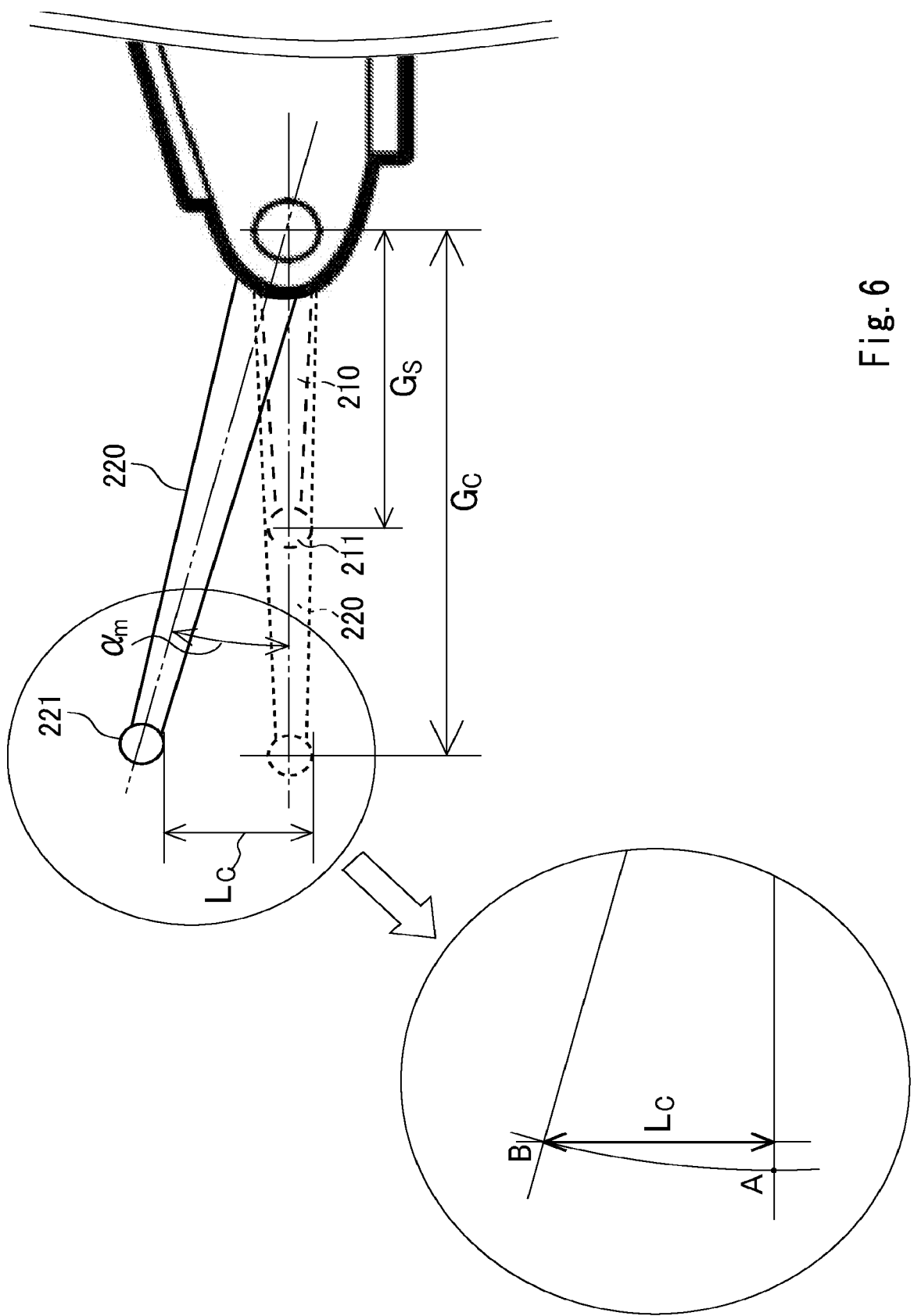
FIG. 6 is a diagram schematically showing the difference between an arc AB and a vertical displacement Lc.

For example, if the measurement range can be widened to 2 mm or more, the test indicator 100 can be used to easily inspect the shape of objects that cannot be measured before. However, although the arc length of an arc AB and the vertical displacement Lc can be regarded as the same when the rotation angle $\alpha m$ of the stylus 210 is small, the difference between them cannot be ignored as the rotation angle $\alpha m$ of the stylus 210 increases. FIG. 6 is a diagram schematically showing the difference between the arc AB and the vertical displacement Lc. For this reason, a correction function for arc chord error is implemented in the present exemplary embodiment.

The arc-chord error correction unit 440 corrects the arc trajectory of the contact point 211 to the vertical displacement of the contact point 211 using the stylus rotation angle αm [rad] calculated by the rotation-angle calculation unit 410.

The arc-chord error correction unit 440 continuously calculates a sine value (=Sin(αm)) of the stylus rotation angle αm [rad] as a correction factor and supplies it to the measurement value calculation unit 460.

The measurement value calculation unit 460 uses this sine value (=Sin(αm)) instead of the rotation angle αm[rad] of the stylus 210 to calculate the displacement Lc of the contact point 211 (an arc-chord error correction calculation step).

$$Lc = (Gc/Gs) \times Gs[mm] \times Sin(\alpha m)$$

$$(= (Gc/Gs) \times Gs[mm] \times Sin(Rr \times \alpha p))$$

Here, the arc-chord error correction unit 440 and the measurement value calculation unit 460 constitute an "arc-chord error correction calculation unit (the arc-chord error correction calculation step)".

In this manner, by performing the correction calculation process (the arc-chord error correction calculation step) using the sine value (=Sin(αm)), it is possible to provide accurate measurement values while increase in the rotation angles αm of the styli 210 and 220 is allowed in the present exemplary embodiment. Thus, it is possible to much further widen the measurement range of the test indicator 100 than conventional models.

Next, the flexure correction unit 450 is described.

Since the styli 210 and 220 can be regarded as having a long thin rod-like shape, when a force (reaction force of the measuring force) is applied to the contact points 211 and 221 from an object to be measured, flexure occurs in the styli 210 and 220. The rotation angles αp of the styli 210 and 220 are reduced by the amount of this flexure, which causes an error in the measurement value (the height of the unevenness of the object to be measured), accordingly. The error caused by the stylus flexure increases as the styli 210 and 220 become longer, and the influence of flexure error cannot be ignored if the stylus 210 is allowed to be replaced with a longer stylus 220. For this reason, a correction function for flexure errors is provided in the present exemplary embodiment.

Figure 7:
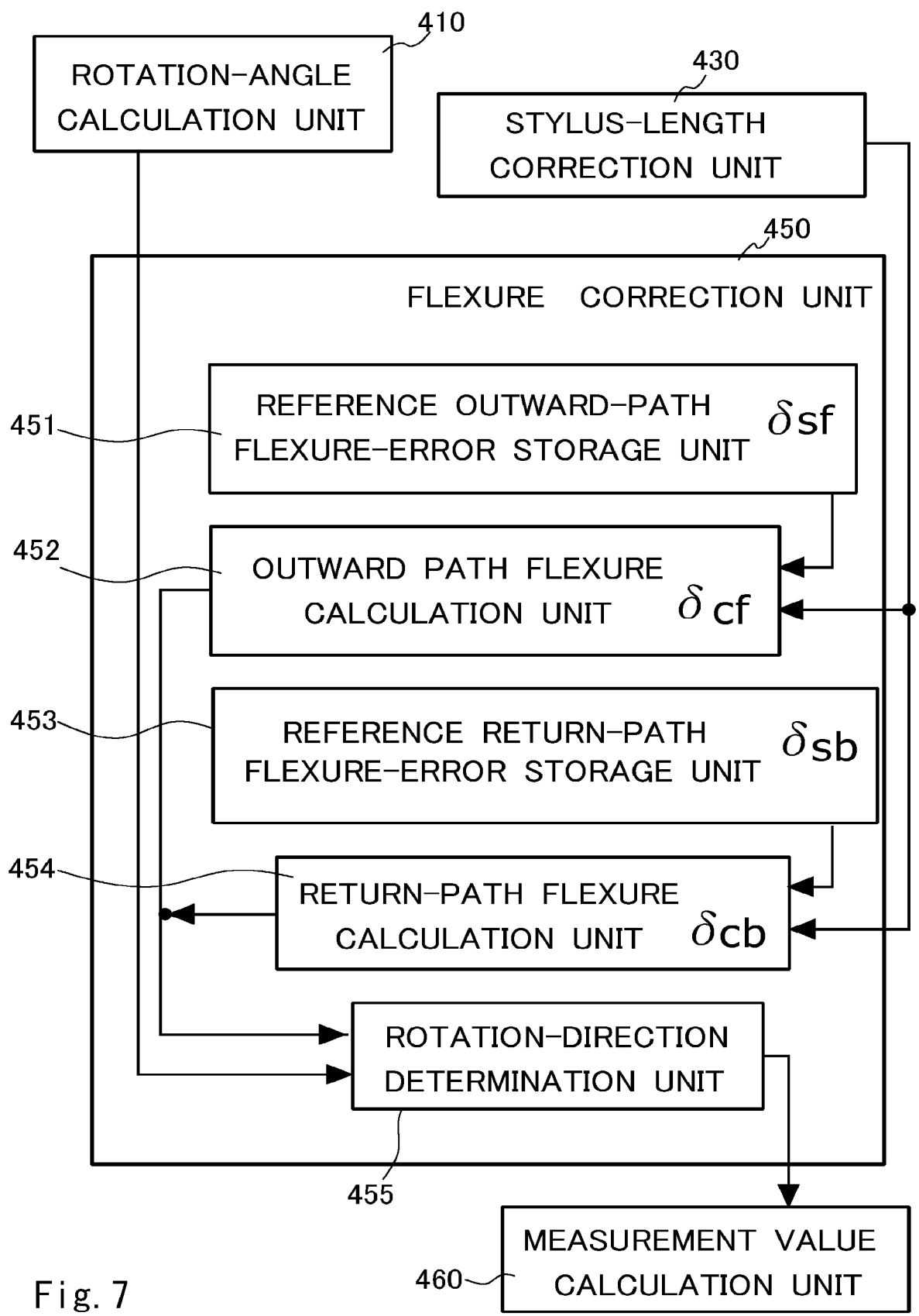
FIG. 7 is a functional block diagram showing a flexure correction unit.

FIG. 7 is a functional block diagram of the flexure correction unit 450.

The flexure correction unit 450 includes a reference outward-path flexure-error storage unit 451, an outward-path flexure calculation unit 452, a reference return-path flexure-error storage unit 453, a return-path flexure calculation unit 454, and a rotation-direction determination unit 455.

The Reference outward-path flexure-error storage unit 451 and the reference return-path flexure-error storage unit 453 are storage units that store the actual measured flexure of the reference stylus 210.

Figure 8:
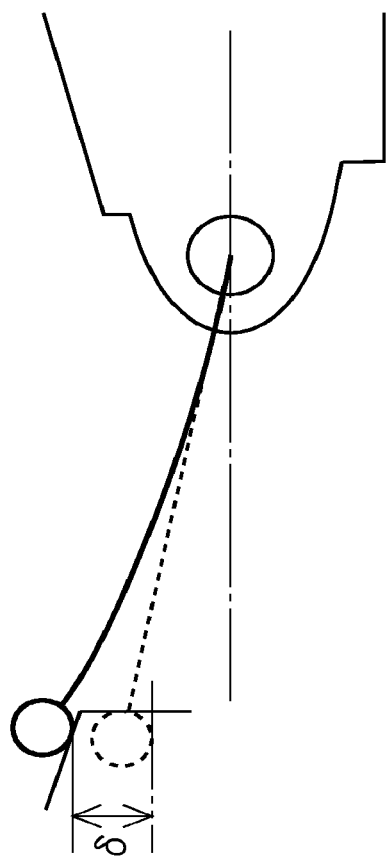
FIG. 8 is a diagram schematically showing an error due to flexure of the stylus (flexure error δ).

For example, by measuring a known height gauge while the reference stylus 210 having a reference length Gs (e.g., 10 mm) is attached to the test indicator 100, the error (flexure error δs) between the height gauge and the actual measurement is obtained. For example, FIG. 8 is a diagram schematically showing an error due to flexure of the stylus 210 (flexure error δ).

As described above, there is a difference in flexure error (return error) between the "outward path" and "return-path" measurements. Thus, a flexure error δs obtained when the gauge is measured on the outward path is set as a reference outward-path flexure error δsf and the value of the reference outward-path flexure error δsf is set and stored in the Reference outward-path flexure-error storage unit 451 (a reference outward-path flexure-error storage step).

In addition, a flexure error δs obtained when the gauge is measured on the return-path is set as a reference return-path flexure error δsb, and the value of the reference return-path flexure error δsb is set and stored in the reference return-path flexure-error storage unit 453 (a reference return-path flexure-error storage step).

For example, the actual measurement error between the "outward path" and "return path" measurements is obtained by measuring a gentle slope with a known slope back and forth.

Next, the calculations by the Outward-path flexure calculation unit 452 and the return-path flexure calculation unit 454 are described.

The amount of flexure of the stylus 210 depends on the length of the stylus 210.

Since the test indicator 100 in the present exemplary embodiment allows the stylus 210 to be replaced, it is necessary to correct the amount of flexure according to the stylus length.

In general, the flexure of a rod is proportional to the load at the tip end and to the cube of its length.

Considering the test indicator 100, the measuring force applied on the tip ends of the styli 210 and 220 of the test indicator 100 is inversely proportional to the lengths of the styli 210 and 220. If only the length of the stylus and the measuring force (load) are considered, the amount of flexure of the styli 210 and 220 of the test indicator 100 is proportional to the square of the lengths of the styli 210 and 220. In other words, if the length of the replaced stylus 220 is Gc with respect to the reference length Gs of the stylus 210, the actual flexure error δc according to the length Gc of the stylus 220 is as follows.

$$\delta c = \delta s \times (Gc/Gs)^2$$

However, the styli 210 and 220 are not round rods with a uniformly thick and rather have a characteristic shape with a taper that decreases in diameter toward the tip. Thus, it cannot be said that its amount of flexure is completely proportional to the square of the length. In practice, it is desirable that the amount of flexure of each stylus is actually measured to obtain the actual flexure value for each stylus or that a correction polynomial that relates the length and the flexure.

When the stylus 210 has been replaced with the stylus 220 with the length Gc, the Outward-path flexure calculation unit 452 converts the reference outward-path flexure error δsf set and stored in the Reference outward-path flexure-error storage unit 451 according to the stylus length Gc to calculate outward-path flexure δcf (=δsf×(Gc/Gs)²) (an outward-path flexure calculation step) and holds the outward-path flexure δcf.

When the stylus 210 has been replaced with the stylus 220 with the length Gc, the return-path flexure calculation unit 454 converts the reference return-path flexure error δsb set and stored in the reference return-path flexure-error storage unit 453 according to the stylus length Gc to calculate return-path flexure δcb (=δsb×(Gc/Gs)²) (a return-path flexure calculation step) and holds the return-path flexure δcb.

The rotation-direction determination unit 455 determines whether the rotation direction of (moving direction) of the stylus 210 is the "outward path" or the "return path" to determine whether the outward path flexure δ or the return-path flexure δcb is used as a flexure correction value. The rotation-direction determination unit 455 calculates, for example, the derivative (difference per unit time) of the rotation angle of styli 210 and 220 obtained by the rotation-angle calculation unit 410, and determines, if the value is positive, that the rotation direction (moving direction) of the styli 210 and 220 is the "outward path". On the other hand, the rotation-direction determination unit 455 determines, if the value is negative, that the rotation direction (moving direction) of the styli 210 and 220 is the "return path".

Note that, if the derivative (the difference per unit time) of the rotation angle of the stylus 210 is zero, it is assumed that the rotation direction (moving direction) of the stylus 210 is the "outward path".

The rotation-direction determination unit 455 continuously determines the rotation direction (moving direction) of the styli 210 and 220, and outputs the flexure error δc to the measurement value calculation unit 460 by switching between "outward path flexure δcf" and "return flexure δcb" according to the determination of the "outward path" or the "return path".

The measurement value calculation unit 460 calculates a corrected measurement value, taking the flexure error 6c in addition to the reference length Gs, the stylus length correction ratio (Gc/Gs), and the sine value of the rotation angle αp into consideration (a flexure error correction calculation step).

$$Lc=(Gc/Gs)\times Gs[mm]\times \mathrm{Sin}(\alpha m)+\delta c$$

Here, the rotation-direction determination unit 455 and the measurement value calculation unit 460 constitute a flexure-error correction calculation unit (the flexure error correction calculation step).

As described above, the test indicator 100 according to the present exemplary embodiment allows its stylus to be replaced with the styli 210 and 220 of different lengths.

At this time, by performing calculation to correct the error factor caused by the longer length of the stylus, it is possible to keep the accuracy and resolution sufficiently high. In addition, by performing the correction calculation process using the sine value (=Sin(αm)), it is possible to provide accurate measurement values while increase in the rotation angles αm of the styli 210 and 220 is allowed.

Thus, by replacing its stylus with another stylus with the length of 20 mm or more to measure the deepest part of the inner surface of a hole having a depth of, for example, 20 mm or more, it is possible to provide the test indicator 100 capable of performing shape inspection over a widened measuring range (for example, 2 mm or more).

In addition, since a user can use a single test indicator 100 by replacing between multiple styli 210, 220, it is possible to greatly reduce the procurement cost of measuring tools and the storage cost of measuring tools.

The present invention is not limited to the above embodiment, but can be changed without deviating from the scope.

In the above embodiment, in the correction for flexure error, it is determined whether measurement is performed on the "outward path" or "return-path" to change the correction value to be used depending on the determined measurement. This is considered necessary when the shape of an object is continuously measured, such as in scanning measurement.

In contrast, when separated measuring points are measured one by one or when measurement is performed slowly even in the case of scanning measurement, the prescribed measuring force is applied strongly between the contact point and an object to be measured, and it is not necessary to distinguish between the "outward path" and the "return path". In this case, the reference return-path flexure-error storage unit 453, the return-path flexure calculation unit 454, and the rotation-direction determination unit 455 may be omitted.

100 Test Indicator
110 Body Case
112 Insertion hole
113 Bearing part
114 Bearing member
120 Display
121 Switch (input means)
210, 220 Stylus
211, 221 Contact point
300 Internal transmission mechanism
310 First arm
311 First axis
312 Distal-side moving surface
313 Proximal-side moving surface
320 Second arm
321 Sector gear
322 Second shaft
323 Distal-side transmission pin
324 Proximal-side transmission pin
330 Pinion
340 Encoder
341 Rotor (Movable body)
342 Stator (Fixed body)
350 Biasing means (Spring)
360 Stopper (Fixing pin)
400 Calculation unit
400 Arc-chord error correction calculation unit
410 Rotation-angle calculation unit
420 Stylus-length storage unit
430 Stylus-length correction unit
440 Arc-chord error correction unit
450 Flexure correction unit
451 Reference outward-path flexure-error storage unit
452 Outward-path flexure calculation unit
453 Reference return-path flexure-error storage unit
454 Return-path flexure calculation unit
455 Rotation-direction determination unit
460 Measurement value calculation unit.

The invention claimed is:

1. A test indicator comprising:
   a stylus having a contact point at a tip end, the contact point being brought into contact with a surface of an object to be measured;
   a body case pivotally supporting the stylus in such a manner as to be rotatable;
   an encoder configured to detect a rotation displacement amount of the stylus;
   a calculation unit configured to convert a detection value by the encoder into a displacement amount of the contact point to calculate a measurement value; and
   a display unit configured to display the measurement value, wherein
   the calculation unit is configured to correct the measurement value based on at least one or more of a length of the stylus, a rotation angle of the stylus, and flexure of the stylus.

2. The test indicator according to claim 1, wherein the calculation unit includes:
   a stylus-length storage unit configured to set and store the length of the stylus; and
   a stylus-length correction calculation unit configured to change, according to the length of the stylus, a conversion ratio for converting the detection value by the encoder into the measurement value to correct the measurement value.

3. The test indicator according to claim 1, wherein the calculation unit includes:
a rotation-angle calculation unit configured to calculate a rotation angle αs[rad] of the stylus based on the detection value by the encoder, and
an arc-chord error correction calculation unit configured to multiply a sine value using the rotation angle αs calculated by the rotation-angle calculation unit as an argument to correct the measurement value.

4. The test indicator according to claim 1, wherein the calculation unit includes:
a stylus-length storage unit configured to set and store the length of the stylus;
a reference flexure-error storage unit configured to store, as a reference flexure error δsf, a flexure error of a reference stylus actually measured when the reference stylus having a predetermined reference length Gs is used;
a flexure calculation unit configured to correct the reference flexure error δsf according to the length of the stylus to calculate an actual flexure error δcf being an actual flexure error; and
a flexure-error correction calculation unit configured to add the actual flexure error δcf calculated by the flexure calculation unit to correct the measurement value.

5. The test indicator according to claim 1, wherein the calculation unit includes:
a stylus-length storage unit configured to set and store the length of the stylus;
a reference outward-path flexure-error storage unit configured to store, as a reference outward-path flexure error δsf, a flexure error of a reference stylus actually measured when the reference stylus having a predetermined reference length Gs rotates in a direction in which a rotation angle of the reference stylus increases;
an outward-path flexure calculation unit configured to correct the reference outward-path flexure error δsf according to the length of the stylus to calculate an actual outward-path flexure error δcf being an actual flexure error;
a reference return-path flexure-error storage unit configured to store, as a reference return-path flexure error δsb, a flexure error of the reference stylus actually measured when the reference stylus having the predetermined reference length Gs rotates in a direction in which the rotation angle of the reference stylus decreases;
a return-path flexure calculation unit configured to correct the reference return-path flexure error δsb according to the length of the stylus to calculate an actual return-path flexure error δcb being an actual flexure error; and
a flexure-error correction calculation unit configured to add the actual outward-path flexure error δcf calculated by the outward-path flexure calculation unit to correct the measurement value when the stylus rotates in a direction in which the detection value by the encoder increases, and to add the actual return-path flexure error δcb calculated by the return-path flexure calculation unit to correct the measurement value when the stylus rotates in a direction in which the detection value by the encoder decreases.

6. A control method for a test indicator, the test indicator including:
a stylus having a contact point at a tip end, the contact point being brought into contact with a surface of an object to be measured; and
a body case pivotally supporting the stylus in such a manner as to be rotatable, the control method comprising:
a rotation detection step of detecting, by an encoder, a rotation displacement amount of the stylus; and
a calculation step of converting a detection value by the encoder into a displacement amount of the contact point to calculate a measurement value; and
a display step of displaying the measurement value, wherein
the calculation step includes correcting the measurement value based on at least one or more of a length of the stylus, a rotation angle of the stylus, and flexure of the stylus.

7. The control method of the test indicator according to claim 6, wherein the calculation step includes:
a stylus-length storage step of setting and storing the length of the stylus; and
a stylus-length correction calculation step of changing, according to the length of the stylus, a conversion ratio for converting the detection value by the encoder into the measurement value to correct the measurement value.

8. The control method of the test indicator according to claim 6, wherein
the calculation step includes:
a rotation-angle calculation step of calculating a rotation angle αs[rad] of the stylus based on the detection value by the encoder, and
an arc-chord error correction calculation step of multiplying a sine value using the rotation angle αs calculated in the rotation-angle calculation step as an argument to correct the measurement value.

9. The control method of the test indicator according to claim 6, wherein
the calculation step includes:
a stylus-length storage step of setting and storing the length of the stylus;
a reference flexure-error storage step of storing, as a reference flexure error δsf, a flexure error of a reference stylus actually measured when the reference stylus having a predetermined reference length Gs is used;
a flexure calculation step of correcting the reference flexure error δsf according to the length of the stylus to calculate an actual flexure error δcf being an actual flexure error; and
a flexure error correction calculation step of adding the actual flexure error δcf calculated in the flexure calculation step to correct the measurement value.

10. The control method of the test indicator according to claim 6, wherein
the calculation step includes:
a stylus-length storage step of setting and storing the length of the stylus;
a reference outward-path flexure-error storage step of storing, as a reference outward-path flexure error δsf, a flexure error of a reference stylus actually measured when the reference stylus having a predetermined reference length Gs rotates in a direction in which a rotation angle of the reference stylus increases;
an outward-path flexure calculation step of correcting the reference outward-path flexure error δsf according to the length of the stylus to calculate an actual outward-path flexure error δcf being an actual flexure error;

a reference return-path flexure-error storage step of storing, as a reference return-path flexure error $\delta sb$, a flexure error of the reference stylus actually measured when the reference stylus having the predetermined reference length Gs rotates in a direction in which the rotation angle of the reference stylus decreases;

a return-path flexure calculation step of correcting the reference return-path flexure error $\delta sb$ according to the length of the stylus to calculate an actual return-path flexure error $\delta cb$ being an actual flexure error; and a flexure error correction calculation step of adding the actual outward-path flexure error $\delta cf$ calculated in the outward-path flexure calculation step to correct the measurement value when the stylus rotates in a direction in which the detection value by the encoder increases, and of adding the actual return-path flexure error $\delta cb$ calculated in the return-path flexure calculation step to correct the measurement value when the stylus rotates in a direction in which the detection value by the encoder decreases.

* * * * *